(No Model.)
W. S. CURTIS.
ARTIFICIAL TOOTH.
No. 350,871. Patented Oct. 12, 1886.
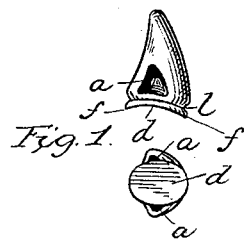
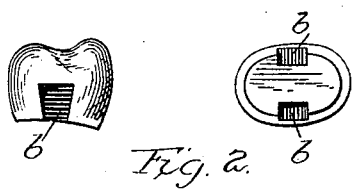
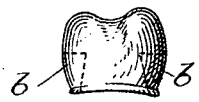
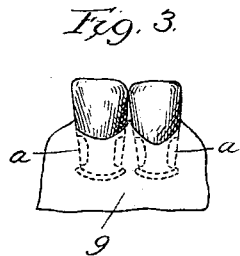
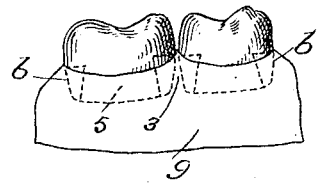
Attest:
Walter Donaldson
Frank L. Middleton
Inventor:
Walter S. Curtis
by Ellis Spear
Atty.

UNITED STATES PATENT OFFICE.

WALTER S. CURTIS, OF WEST RANDOLPH, VERMONT.

ARTIFICIAL TOOTH.

SPECIFICATION forming part of Letters Patent No. 350,871, dated October 12, 1886.

Application filed July 26, 1886. Serial No. 209,121. (No model.)

*To all whom it may concern:*

Be it known that I, WALTER S. CURTIS, a citizen of the United States, residing at West Randolph, in the county of Orange and State of Vermont, have invented certain new and useful Improvements in Artificial Teeth, of which the following is a specification.

My invention relates to improvements in the form and shape of artificial teeth in reference to the manner of attaching and holding them to a plastic base or gum; and the objects of my invention are, first, to provide artificial teeth in which the strength, after their attachment with the plastic base or gum, is not materially impaired by means of the slots or dovetails, and shoulders or projections at the base or on the sides of such teeth for attaching and holding such teeth to the plastic base or gum; second, to provide artificial teeth which, by means of certain slots, dovetails, or indentures made therein, or certain rims or projections made thereon, hereinafter more fully described, may be firmly and strongly attached to any plastic base or gum, and which, when so attached, will so remain, notwithstanding the natural shrinking away from the teeth of the plastic base or gum; third, to provide artificial teeth that can be more easily adjusted and attached to the plastic base or gum than heretofore. I attain these objects by the forms of teeth represented in the accompanying drawings, which form a part of this specification, and in which—

Figure 1 represents the side view of a lateral incisor artificial tooth with my improved slot or indenture for attaching the same to the plastic base or gum, also the base of the same tooth. Fig. 2 represents the side view of a first molar tooth with my improved dovetail or slot for attaching the same to the plastic base or gum, also the base of the same tooth. Fig. 3 represents a sectional view of the front portion of a plate of teeth with the teeth adjusted to the plastic base or gum ready for use, the dotted lines of which represent the outlines of the plastic base or gum as it exists in connection with the tooth. Fig. 4 represents a sectional view of the palatal portion of a plate of teeth with the teeth adjusted to the plastic base or gum ready for use, the dotted lines of which represent the outlines of the plastic base or gum as it exists in connection with the tooth.

Similar letters refer to similar parts throughout the several drawings.

In Fig. 1, *a* represents a cone-shaped slot or indenture made in each side of the tooth, of such depth as may be desired, into which the plastic base or gum *g* passes during the process of constructing the plate. Just below the base of this slot or indenture, and extending around the tooth, is the indenture crease or channel *e*, terminating at the base of the tooth with the rim or projection *f*, which also extends around the tooth, into which crease or channel the plastic base or gum also passes during the construction of the plate. The base of the tooth *d* consists of a conical and continuous surface, which rests upon and is embedded in the plastic base or gum when adjusted. The plastic base or gum passing into and completely filling the slot or indenture *a*, also the indenture, crease, or channel *e*, and the conical and unbroken surface of the base of the tooth resting on the plastic base or gum, as above mentioned, renders the tooth firmly and strongly attached to and supported by the plastic base or gum. As will be seen, the tooth is held down to the plastic base or gum both by means of the slot or indenture *a* and the crease or channel *e*, so that any shrinkage of the plastic base or gum will not cause the tooth to loosen or decrease the strength with which it is attached to the plastic base or gum. The plastic base or gum which flows into the slot or indenture *a* being so far above the base of the tooth *d*, which is the support of the tooth, produces a lever-purchase power in addition to that produced by the base or gum flowing into the crease or channel *e*, for resisting any lateral or other pressure or strain on the tooth. The tooth being solid and the surface or contour continuous and unbroken, aside from the slight indenture or slot *a*, the strength of the tooth is not impaired by the means provided, as above described, for its attachment to the plastic base or gum, and owing to this new and novel method of attachment the tooth will easily resist all strain or pressure without splitting. This form of slot or indenture, crease, or channel, rim or projection, &c., is, however, more especially adapted to the front or incisor teeth, and the back or bicuspid and molar teeth may be made according to the representations in Figs. 2 and 4 of the drawings. In this form the dovetail or slot is formed upon either side of the tooth, and, beginning at the base, its three sides diverge from each other and extend to a point about midway between the base and crown. From this construction I secure a novel result, for the reason that when two teeth are brought side by side and the plastic gum or base is applied a tongue is formed, as shown at 3 in Fig. 4, between the adjacent teeth having its four sides diverging from a point at the base of the teeth by reason of the plastic material entering the dovetail groove or slots. This construction also forms a dovetail projection of the body of the tooth, as shown at 5, Fig. 4. It will clearly be seen that a very effective connection is thus formed between the teeth and the gum or base adapted to resist strain from all directions, and also allowing for any shrinkage to which the gum or base may be subjected.

Having thus fully described my invention, what I claim as new, and desire to secure by Letters Patent of the United States, is—

1. In an artificial tooth, means for attaching it to a plastic base or gum, consisting of indentures formed in the side thereof, in combination with a projecting rim, substantially as described.

2. In an artificial tooth, and in combination, the unbroken base $d$ and the flange or rim $f$, substantially as and for the purpose set forth.

3. In an artificial tooth, a recess or indenture formed in the side thereof above the edge of the base, whereby a shoulder is formed, substantially as shown.

WALTER S. CURTIS.

Witnesses:
GEO. A. LAIRD,
JAS. H. BURT.